US012602836B2

(12) United States Patent
Nguyen Canh et al.

(10) Patent No.: US 12,602,836 B2
(45) Date of Patent: Apr. 14, 2026

(54) METHOD TO GENERATE DISPLACEMENT FOR SYMMETRY MESH

(71) Applicant: Tencent America LLC, Palo Alto, CA (US)

(72) Inventors: Thuong Nguyen Canh, San Bruno, CA (US); Chao Huang, Palo Alto, CA (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 113 days.

(21) Appl. No.: 18/604,065

(22) Filed: Mar. 13, 2024

(65) Prior Publication Data

US 2024/0312066 A1 Sep. 19, 2024

Related U.S. Application Data

(60) Provisional application No. 63/453,033, filed on Mar. 17, 2023.

(51) Int. Cl.
*G06T 9/00* (2006.01)
*G06T 17/20* (2006.01)

(52) U.S. Cl.
CPC .............. *G06T 9/001* (2013.01); *G06T 17/20* (2013.01); *G06T 2210/21* (2013.01)

(58) Field of Classification Search
CPC ...... G06T 9/001; G06T 17/20; G06T 2021/21
USPC .......................................................... 345/418
See application file for complete search history.

(56) References Cited

U.S. PATENT DOCUMENTS

| | | | | |
|---|---|---|---|---|
| 12,243,277 B2 * | 3/2025 | Nguyen Canh | ...... | H04N 19/119 |
| 12,243,279 B2 * | 3/2025 | Nguyen Canh | ...... | H04N 19/136 |
| 12,373,990 B2 * | 7/2025 | Nguyen Canh | ......... | G06T 9/001 |
| 2005/0131660 A1 * | 6/2005 | Yadegar | ................. | G06T 9/002 |
| | | | | 375/240 |
| 2021/0335039 A1 * | 10/2021 | Jones | ..................... | G06T 19/20 |
| 2022/0036654 A1 | 2/2022 | Nakagami et al. | | |

(Continued)

FOREIGN PATENT DOCUMENTS

| | | | | |
|---|---|---|---|---|
| WO | WO-2024147807 A1 * | 7/2024 | .......... | G06T 17/205 |
| WO | WO-2024167508 A1 * | 8/2024 | .......... | G06T 17/205 |
| WO | WO-2024192096 A1 * | 9/2024 | ............. | G06T 9/001 |

OTHER PUBLICATIONS

Golovinskiy A, Podolak J, Funkhouser T. Symmetry-aware mesh processing. InIMA International Conference on Mathematics of Surfaces Sep. 7, 2009 (pp. 170-188). Berlin, Heidelberg: Springer Berlin Heidelberg.*

(Continued)

*Primary Examiner* — Phu K Nguyen
(74) *Attorney, Agent, or Firm* — Sughrue Mion, PLLC

(57) ABSTRACT

A method of encoding a mesh comprises: determining a first plane based on a first input vertex located on a first side of the mesh, a direction vector, and a first vector selected along an axis having a largest angle from the direction vector; determining a second plane based on a second input vertex on a symmetry plane, the direction vector, and a second vector that is perpendicular to the first vector and the direction vector; determining a vertex to be mapped to the first input vertex on the first side of the mesh based on (i) a line that passes through the first input vertex and the second input vertex and (ii) the first and second planes.

16 Claims, 6 Drawing Sheets

(56)          References Cited

U.S. PATENT DOCUMENTS

| | | | |
|---|---|---|---|
| 2022/0068007 A1* | 3/2022 | Lafer | .......................... G06T 7/50 |
| 2023/0078840 A1 | 3/2023 | Salvi et al. | |
| 2024/0029316 A1* | 1/2024 | Nguyen Canh | ...... H04N 19/119 |
| 2024/0221229 A1* | 7/2024 | Nguyen Canh | ......... G06T 17/20 |
| 2024/0331204 A1* | 10/2024 | Kadam | ..................... G06T 3/60 |
| 2024/0346703 A1* | 10/2024 | Nguyen Canh | ........... G06T 7/68 |
| 2025/0159255 A1* | 5/2025 | Kadam | ................ H04N 19/597 |
| 2025/0173906 A1* | 5/2025 | Huang | ................... G06T 9/001 |
| 2025/0232481 A1* | 7/2025 | Kadam | ................. H04N 19/70 |

OTHER PUBLICATIONS

Wang Y, Xu K, Li J, Zhang H, Shamir A, Liu L, Cheng Z, Xiong Y. Symmetry hierarchy of man-made objects. InComputer graphics forum Apr. 2011 (vol. 30, No. 2, pp. 287-296). Oxford, UK: Blackwell Publishing Ltd.*

International Search Report issued Jun. 17, 2024 in Application No. PCT/US24/20045.

Written Opinion issued Jun. 17, 2024 in Application No. PCT/US24/20045.

* cited by examiner

S302 — Derive first plane p1

S304 — Derive second plane p2

S306 — Determine potential intersection interfaces

S308 — Select mapped vertex

Start

End

300

METHOD TO GENERATE DISPLACEMENT FOR SYMMETRY MESH

CROSS-REFERENCE TO RELATED APPLICATION

This application claims priority from U.S. Provisional Application No. 63/453,033 filed on Mar. 17, 2023, the disclosure of which is incorporated herein by reference in its entirety.

FIELD

This disclosure is directed to a set of advanced video coding technologies. More specifically, the present disclosure is directed to generating a displacement for a symmetry mesh.

BACKGROUND

VMesh is an ongoing MPEG standard aimed at compressing dynamic meshes. The compression process in VMesh is based on a decimated base mesh, which is first encoded using the Draco algorithm. The base mesh is decimated to reduce the number of vertices, making the compression process more efficient. The displacement vectors are then calculated by searching for the closest point on the original mesh with respect to each vertex of the subdivided base mesh.

Reflection symmetry is a popular characteristic of mesh, especially computer generated meshes. Symmetry was utilized to compress symmetry mesh. Vertices are divided into left and right part of the symmetry plane. The left part is encoded by mesh coding while the right part is encoded by a symmetry prediction and displacement coding. Even though the texture coordinate (or UV attribute) also has a certain level of symmetry but can be in difference symmetry property like transition and rotation.

Existing mesh coding algorithms are designed to exploit the local characteristics of individual vertices, edges, and faces, such as their geometric shapes, surface normal, and texture information. By focusing on these local features, mesh coding algorithms can effectively improve its compression efficiency. However, there is lack of utilization on global characteristics of the mesh such as symmetry property.

The one-to-one mapping by nearest vertex method is a simple approach for mapping the vertices of one mesh to another which is crucial to generate displacement vector. This method is simple and easy to implement but could not handle symmetry prediction error, especially for near symmetry and/or complex mesh with multiple surfaces. It can results a mapped mesh with a significant deviation from the original shape of the mesh.

SUMMARY

According to one or more embodiments, a method of encoding a mesh comprises determining a symmetry plane the divides the mesh into a first side and a second side opposite the first side; determining a first plane based on a first input vertex located on the first side of the mesh, a direction vector, and a first vector selected along an axis having a largest angle from the direction vector; determining, as a first set, each vertex of the mesh on the second side of the mesh that is on a first side of the first plane or on the first plane; determining, as a second set, each vertex on the second side of the mesh that is on a second side of the first plane, the second side of the first plane opposite to the first side of the first plane; determining a second plane based on a second input vertex on the symmetry plane, the direction vector, and a second vector that is perpendicular to the first vector and the direction vector; determining, as third set, each vertex on the second side of the mesh that is on a first side of the second plane or on the second plane; determining, as a fourth set, each vertex on the second side of the mesh that is on a second side of the second plane, the second side of the second plane opposite to the first side of the first plane; and determining a vertex to be mapped to the first input vertex on the first side of the mesh based on (i) a line that passes through the first input vertex and the second input vertex and (ii) the determined first set, the determined second set, the determined third set, and the determined fourth set.

According to one or more embodiments, a method of encoding a mesh comprises generating a bitstream comprising the mesh, wherein a symmetry plane that divides the mesh into a first side and a second side opposite the first side is determined, wherein a first plane is determined based on a first input vertex located on the first side of the mesh, a direction vector, and a first vector selected along an axis having a largest angle from the direction vector, wherein, as a first set, each vertex of the mesh on the second side of the mesh that is on a first side of the first plane or on the first plane is determined, wherein, as a second set, each vertex on the second side of the mesh that is on a second side of the first plane, the second side of the first plane opposite to the first side of the first plane is determined, wherein a second plane is determined based on a second input vertex on the symmetry plane, the direction vector, and a second vector that is perpendicular to the first vector and the direction vector, wherein, as third set, each vertex on the second side of the mesh that is on a first side of the second plane or on the second plane is determined, wherein, as a fourth set, each vertex on the second side of the mesh that is on a second side of the second plane, the second side of the second plane opposite to the first side of the first plane is determined, and wherein a vertex to be mapped to the first input vertex on the first side of the mesh is determined based on (i) a line that passes through the first input vertex and the second input vertex and (ii) the determined first set, the determined second set, the determined third set, and the determined fourth set.

According one or more embodiments, a method decoding a mesh comprises processing a bitstream comprising the mesh, wherein a symmetry plane that divides the mesh into a first side and a second side opposite the first side is determined, wherein a first plane is determined based on a first input vertex located on the first side of the mesh, a direction vector, and a first vector selected along an axis having a largest angle from the direction vector, wherein, as a first set, each vertex of the mesh on the second side of the mesh that is on a first side of the first plane or on the first plane is determined, wherein, as a second set, each vertex on the second side of the mesh that is on a second side of the first plane, the second side of the first plane opposite to the first side of the first plane is determined, wherein a second plane is determined based on a second input vertex on the symmetry plane, the direction vector, and a second vector that is perpendicular to the first vector and the direction vector, wherein, as third set, each vertex on the second side of the mesh that is on a first side of the second plane or on the second plane is determined, wherein, as a fourth set, each vertex on the second side of the mesh that is on a second side of the second plane, the second side of the second plane opposite to the first side of the first plane is determined, and wherein a vertex to be mapped to the first input vertex on the first side of the mesh is determined based on (i) a line that passes through the first input vertex and the second input vertex and (ii) the determined first set, the determined second set, the determined third set, and the determined fourth set.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
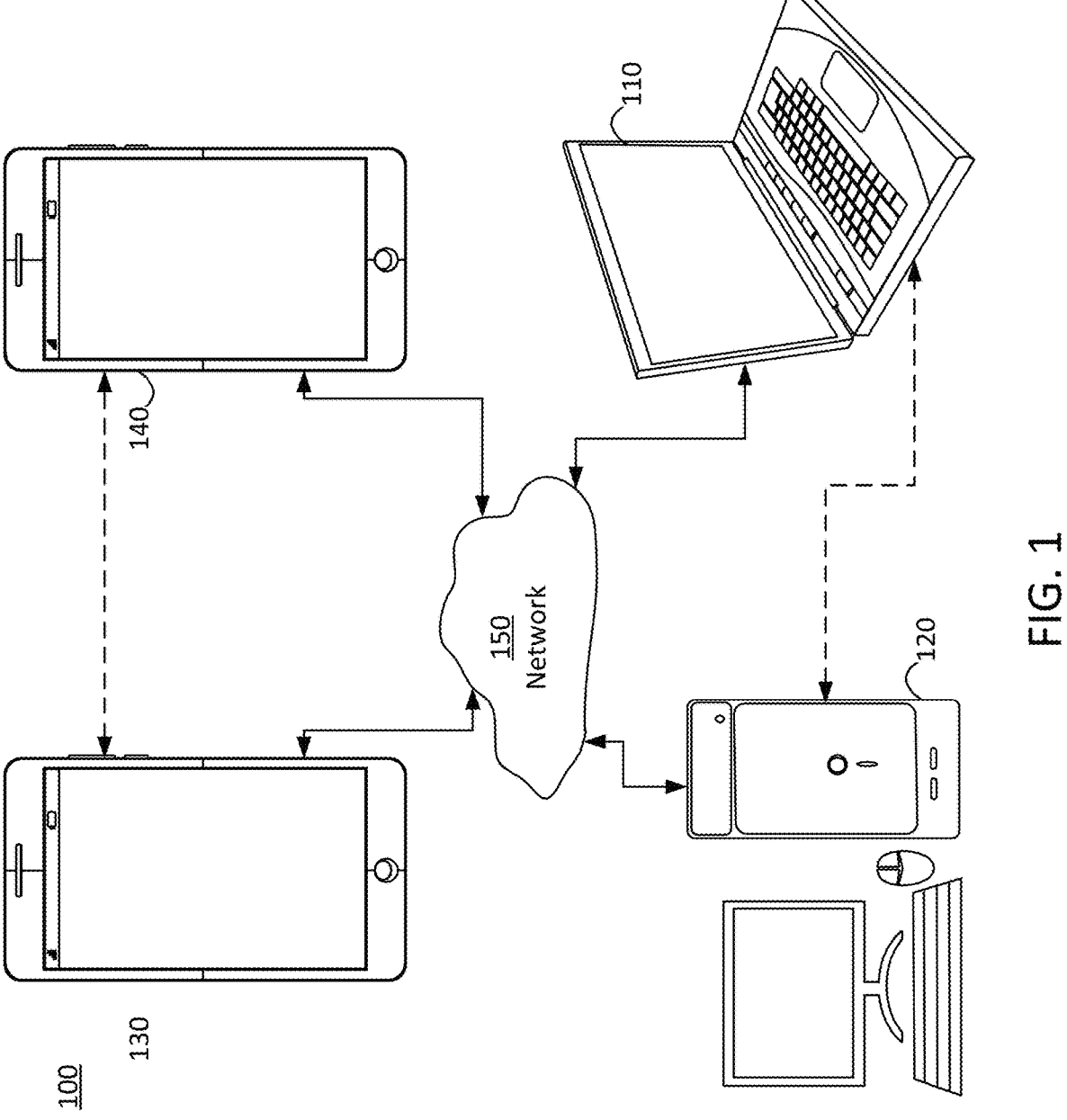
FIG. 1 is a schematic illustration of a block diagram of a communication system, in accordance with embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Figure 2:
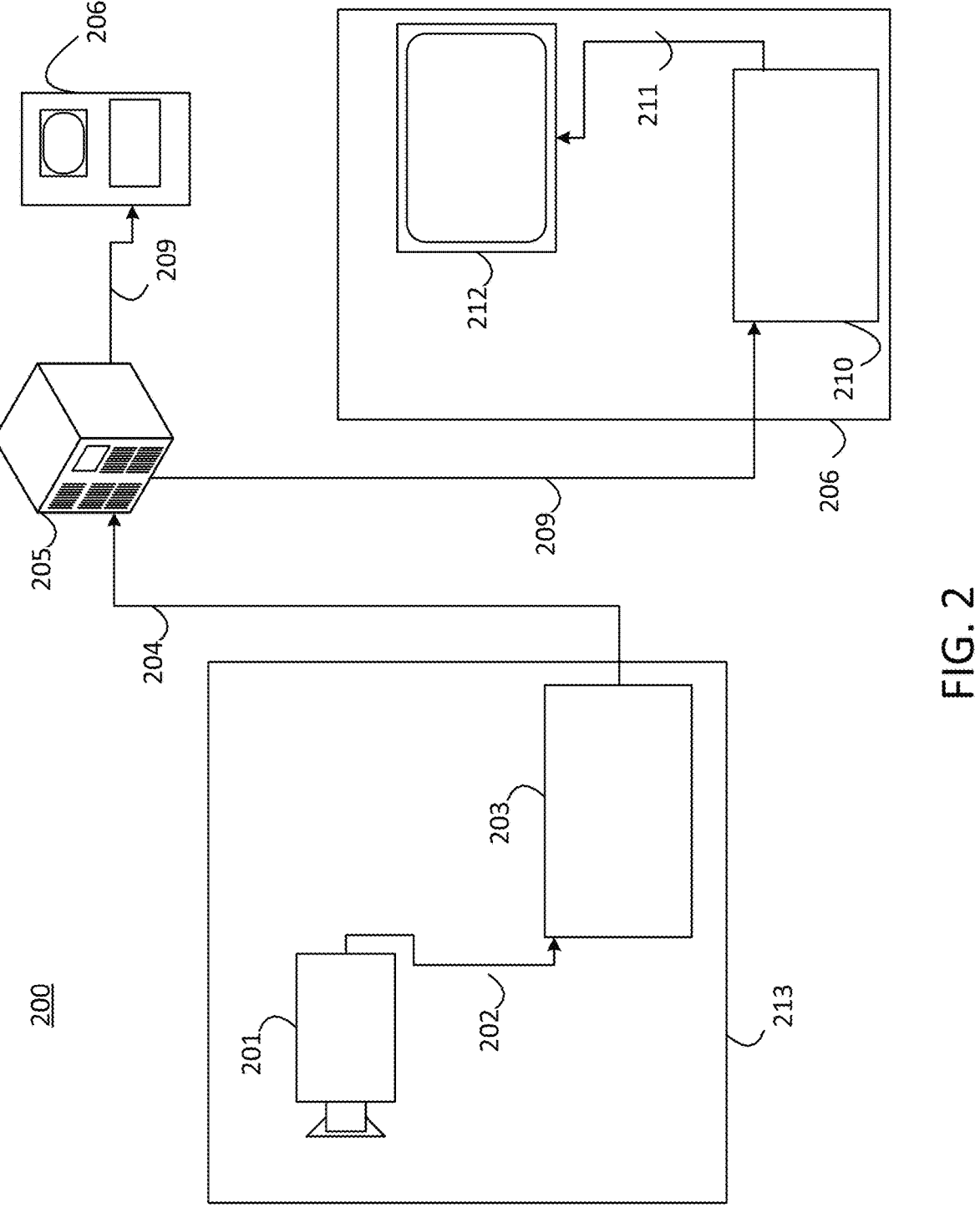
FIG. 2 is a schematic illustration of a block diagram of a streaming system, in accordance with embodiments of the present disclosure.

With reference to FIGS. 1-2, one or more embodiments of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-

140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 may, for example, decode video bitstream 209, which is an incoming copy of the encoded video bitstream 204, and create an outgoing video sample stream 211 that may be rendered on the display 212 or another rendering device. In some streaming systems, the video bitstreams 204, 209 may be encoded according to certain video coding/compression standards.

A mesh is composed of several polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps. This standard targets lossy, and lossless compression for various applications, such as real-time communications, storage, free viewpoint video, AR and VR. Functionalities such as random access and scalable/progressive coding are also considered.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

Embodiments of the present disclosure are directed to a method for mapping a predicted symmetry mesh and an original mesh to establish a one-to-one mapping for the generation of displacement.

The proposed methods in this disclosure are flexible and can be used either individually or in combination, in any order, for arbitrary polygon meshes. Although the triangle mesh is used for illustration purposes, the methods can be applied to other types of meshes as well. The mesh may have some degree of symmetry in geometry, and the symmetry coding method is designed to use half of the mesh (e.g., referred to as the "left mesh") to predict the other half (e.g., referred to as the "right mesh").

According to one or more embodiments, directional one-to-one mapping is a process of finding a mapped vertex $v_m$ on a target mesh $\mathcal{O}$, given a vertex v and a direction on the input mesh $\vec{d}$. To achieve this, a line $\ell$ is defined that passes through the input vertex and follows the specified direction $\vec{d}$. The next operation is to find the intersection between this line $\ell$ and the surface of the target mesh $\mathcal{O}$.

This one-to-one vertex mapping process may be divided into the following operations: (1) identifying the potential faces on the surface of target mesh $\mathcal{O}$ that intersect with the line $\ell$, (2) finding the intersection point, and (3) select one point as the mapped vertices.

Figure 3:
FIG. 3 illustrates a flowchart of an example process performed by an encoder, in accordance with embodiments of the present disclosure.

FIG. 3 illustrates an example process 300 for performing a one-to-one vertex mapping. The process 300 may be performed by the encoder 203. The description of the process 300 is provided with respect to FIGS. 4(A) and 4(B).

The process may start at operation S302 where a first plane $p_1$ is derived. In one or more examples, the first plane $p_1$ may be derived based on the input vertex v and the direction vector $\vec{d}$. To derive the first plane, an additional basic vector is selected from (1, 0, 0), (0, 1, 0), and (0, 0, 1)

that has the largest angle with $\vec{d}$. For example, in FIG. 4A, the vector (1, 0, 0) is selected. Once the first plane has been derived, all vertices of the target mesh $\mathcal{O}$ are classified into three sets: the left set $\mathcal{L}_1$, the right set $\mathcal{R}_1$, and the plane set $\mathcal{P}_1$. The vertices in the left set $\mathcal{L}_1$ are those that are located on the left side of the plane $p_1$, the vertices in the right set $\mathcal{R}_1$ are those that are located on the right side of the plane $p_1$, and the vertices in the plane set $\mathcal{P}_1$ are those that lie on the plane $p_1$ itself.

The process proceeds to operation S304 where a second plane $p_2$ is derived. In one or more examples, the second plane $p_2$ based on the input vertex r, the direction vector $\vec{d}$, and a perpendicular vector to both $\vec{x}$ and $\vec{d}$. This perpendicular vector is used to define the orientation of the second plane. Like step 1, all vertices of $\mathcal{O}$ are classified as left set $\mathcal{L}_2$, right set $\mathcal{R}_2$, or plane set $\mathcal{P}_2$.

The process proceeds to operation S306 where potential intersection interfaces are identified. Once the potential intersection faces have been identified, the next step is to find the actual intersection points between the line and the target mesh. This can be done by finding the points of intersection between the line and each of the potential intersection faces.

Potential intersection faces may be derived as follows. A k polygonal face $f=\{v_1, v_2, \ldots, v_k)\}$ is an intersection faces if the following conditions are met:

$$f \cap \{\mathcal{L}_1, \mathcal{P}_1\} \neq \emptyset, f \cap \{\mathcal{R}_1\} \neq \emptyset$$

$$f \cap \{\mathcal{L}_2, \mathcal{P}_2\} \neq \emptyset, f \cap \{\mathcal{R}_2\} \neq \emptyset$$

Figures 4A, 4B:
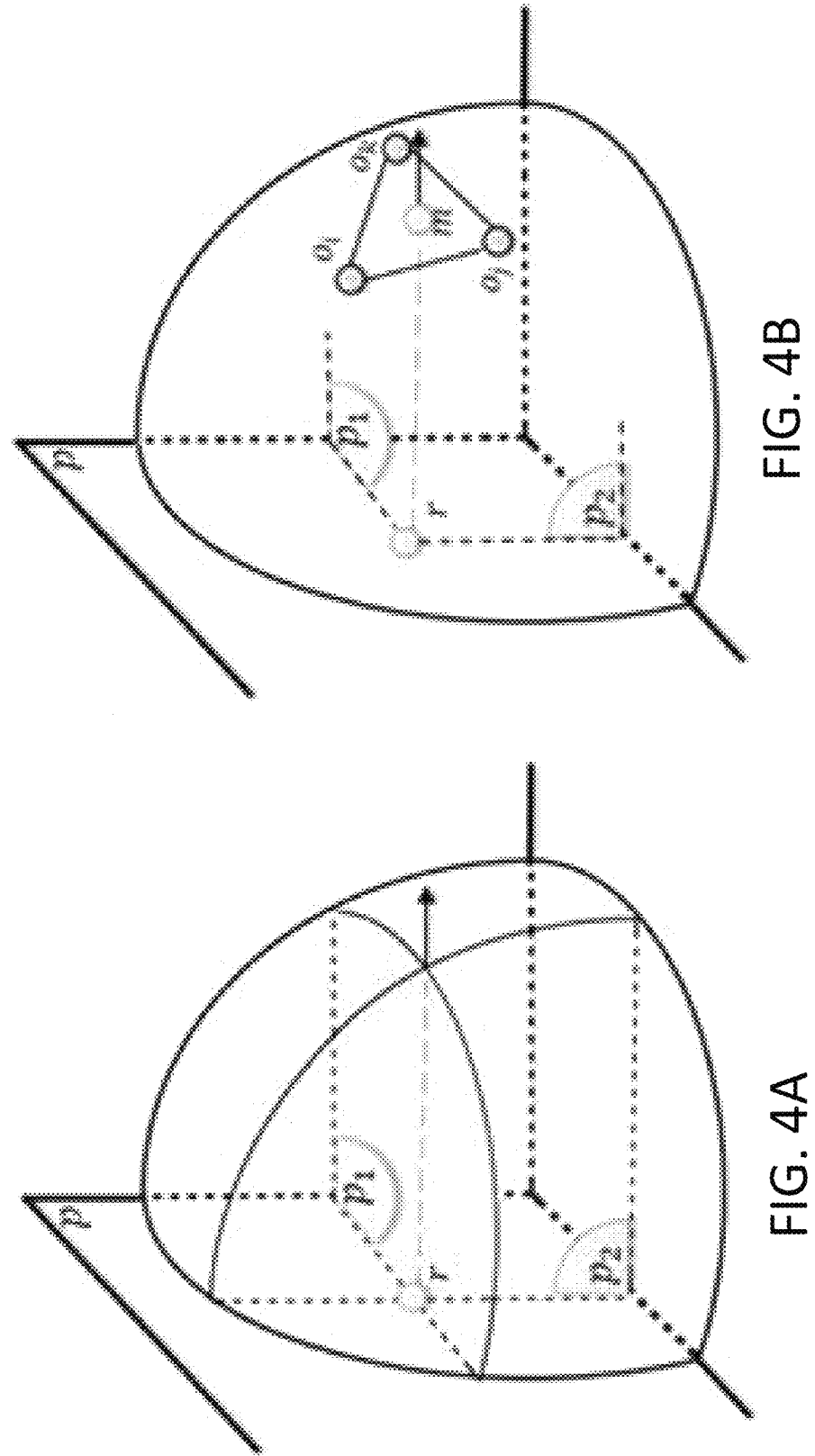
FIG. 4A illustrates an example of mapping a vertex in a mesh, in accordance with embodiments of the present disclosure.
FIG. 4B illustrates an example of mapping a vertex in a mesh, in accordance with embodiments of the present disclosure.

FIGS. 4A and 4B illustrates finding perpendicular mapping vertex m of given vertex r, given a symmetry plane p, and a 3D mesh $\mathcal{O}$ defines a by set of vertices $o_{i,j,k}$.

The process proceeds to operation S308 where a mapped vertex is selected. Once the potential intersection points have been identified, the next operation in the directional mapping process is to select the mapped vertex.

In a first scenario, if there is no intersection face, the nearest vertex to the line $\ell$ is selected, along with its associated faces. From the associated faces, the nearest vertex to the line $\ell$ is then chosen as the mapped vertex.

In a second scenario, if there is only one intersected vertex, it is considered as the mapped vertex. However, if there are more than one intersected vertex, the nearest distance to the input vertex v is selected as the mapped vertex. This distance can be calculated using any norm distance, such as the Euclidean distance.

In a third scenario, if there is more than one intersection point, the nearest one to the input vertices is selected. This scenario limited to handling simple mesh surfaces that are either single-surfaced or have relatively simple surface features. It is not suitable for more complex mesh surfaces that may have multiple surfaces or near-symmetric features.

According to one or more embodiments, the process of symmetry coding assumes of a symmetry plane p being estimated and the left mesh $\mathcal{L}$ being extracted. The encoder compresses the left mesh and then uses the decoded left mesh to predict the right mesh. To compensate for any inaccuracies in the symmetry prediction, a displacement vector between the predicted right mesh $\tilde{\mathcal{R}}$ and the original right mesh $\mathcal{R}$ is generated based on a mapped mesh $\mathcal{M}_\mathcal{R}$.

In one or more examples, in this process, the direction vector used for mapping the vertices of $\mathcal{M}_\mathcal{R}$ is the normal direction n of the symmetry plane p by applying the mapping technique illustrated in FIG. 3. The following method handles the third scenario of multiple intersection points.

The number of points intersected by each line $\ell$ pass-through vertex in n direction may be represented by the set of vertices $\mathcal{V}_\mathcal{L}=\{v_\mathcal{L}^1, \ldots, v_\mathcal{L}^{m_\mathcal{L}}\}$ and $\mathcal{V}_\mathcal{R}=\{v_\mathcal{R}^1, \ldots, v_\mathcal{R}^{m_\mathcal{R}}\}$, with $m_\mathcal{L}$ representing the number of points intersected in the left mesh and $m_\mathcal{R}$ representing the number of points intersected in the right mesh. The handling of a simple case (e.g., first scenario and a second scenario) are the same.

In the scenario in which $m_\mathcal{L}=1$ and $m_\mathcal{R}=2$, the mapped vertex shall be determined by taking the average of the two intersection points in the right mesh. That is, $v_\mathcal{L}^1$ is mapped to $\bar{v}_\mathcal{R}=\frac{1}{2}(v_\mathcal{R}^1, v_\mathcal{R}^2)$.

For the scenario in which either $m_\mathcal{L}$ or $m_\mathcal{R}=1$, both vertices in one side are mapped to the other side vertex.

For the scenario in which $m_\mathcal{L}=m_\mathcal{R}\geq2$, the mapping of the vertices shall be based on their relative distance to a symmetry plane. Firstly, order the vertices set follow the decreasing distance to the symmetry plane as $\mathcal{V}_\mathcal{L}^*=\{v_\mathcal{L}^{*1}, \ldots, v_\mathcal{L}^{*m_\mathcal{L}}\}$ and $\mathcal{V}_\mathcal{R}=\{v_\mathcal{R}^{*1}, \ldots, v_\mathcal{R}^{*m_\mathcal{R}}\}$. Then, the mapping process shall be carried out with corresponding pair $v_\mathcal{L}^{*i}$ and $v_\mathcal{R}^{*i}$.

For the scenario in which $m_\mathcal{L} \neq m_\mathcal{R} \geq2$, the mapping of the vertices shall be based on the relative distance to a symmetry plane but in both decreasing and increasing order. Firstly, order the vertices set follow the decreasing distance to the symmetry plane as $\mathcal{V}_\mathcal{L}^*=\{v_\mathcal{L}^{*1}, \ldots, v_\mathcal{L}^{*m_\mathcal{L}}\}$ and $\mathcal{V}_\mathcal{R}=\{v_\mathcal{R}^{*1}, \ldots, v_\mathcal{R}^{*m_\mathcal{R}}\}$. Vertices are mapped with the most and the least distance pair such as ($v_\mathcal{L}^{*1}$, $v_\mathcal{R}^{*1}$) and ($v_\mathcal{L}^{*m_\mathcal{L}}$, $v_\mathcal{R}^{*m_\mathcal{R}}$). Then sub-sequent removed mapped vertices in both set $\mathcal{V}_\mathcal{L}^*=\{v_\mathcal{L}^{*2}, \ldots, v_\mathcal{L}^{*m_\mathcal{L}-1}\}$ and $\mathcal{V}_\mathcal{R}=\{v_\mathcal{R}^{*2}, \ldots, v_\mathcal{R}^{*m_\mathcal{R}-1}\}$ until either set has one vertex left. The remaining vertices may be mapped according to the scenario in which $m_\mathcal{L}$ or $m_\mathcal{R}=1$.

Figure 5:
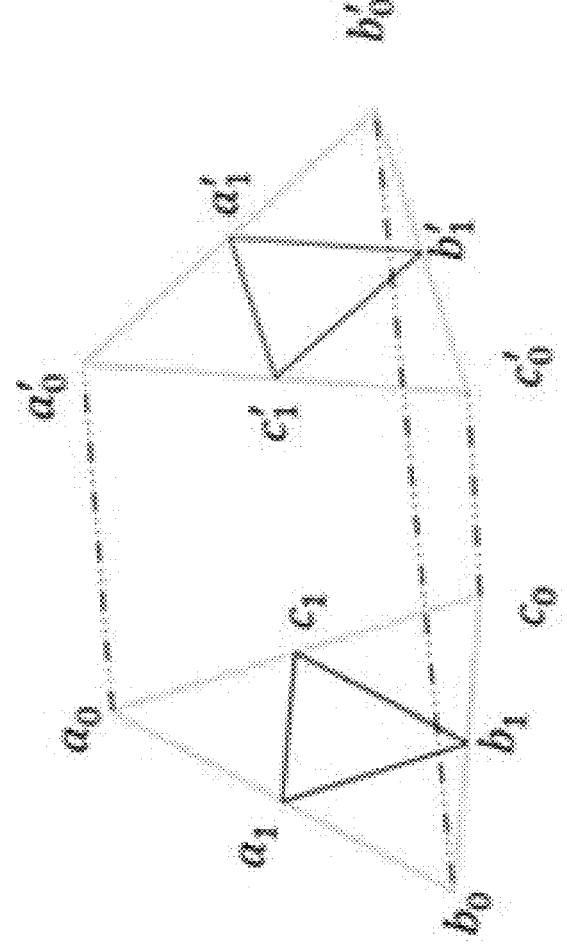
FIG. 5 illustrates an example sub-divided mesh, in accordance with embodiments of the present disclosure.

The time for performing the previously disclosed embodiments for vertex mapping may be large. Moreover, mapping each vertex individually may lead to inconsistencies in displacement rates between nearby vertices. These drawbacks may be mitigated by employing the following method. In this embodiment, it is proposed to use the above-described embodiments to map vertex on mirror base left mesh to the original right mesh first, then subsequently mapping the sub-divided location mirror reconstructed left and the original right mesh. FIG. 5 illustrates base vertices mapping and subdivided vertices mapping. Base vertices are one-to-one mapped first. Then sub-divided mapping is inferred. For example, referring to FIG. 5, the predicted base mesh vertex $a_0$, $b_0$, $c_0$ are mapped to the original right $a'_0$, $b'_0$, $c'_0$ first. Then the subdivided of the predicted right $a_1$, $b_1$, $c_1$ are derived and mapped to the left side.

In this embodiment, it is proposed to map base mesh plus sub-divided mesh at a given level of details L. For instance, in FIG. 5, not only base vertices but also their subdivided are mapped first. Further subdividing will be inferred. In one or more embodiments, the level of details is decided based on the complexity of the right mesh. In other embodiments, mapping distortion for base mesh at multiple level of details are evaluated. The best one with lowest distortion are selected and signal to the bitstream.

According to one or more embodiments, a decoder such as decoder 210 (FIG. 2) may receive a bitstream with a mesh encoded in accordance with the above-described embodiments. The decoder may decode the mesh using displacement coding. For example, the decoder may decode the mesh by reconstructing a first side of the mesh (e.g., left side), and reconstructing the second side of the mesh (e.g., right side) using mapped vertices and any associated displacement vectors.

The techniques, described above, may be implemented as computer software using computer-readable instructions and physically stored in one or more computer-readable media. For example, FIG. 6 shows a computer system 600 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
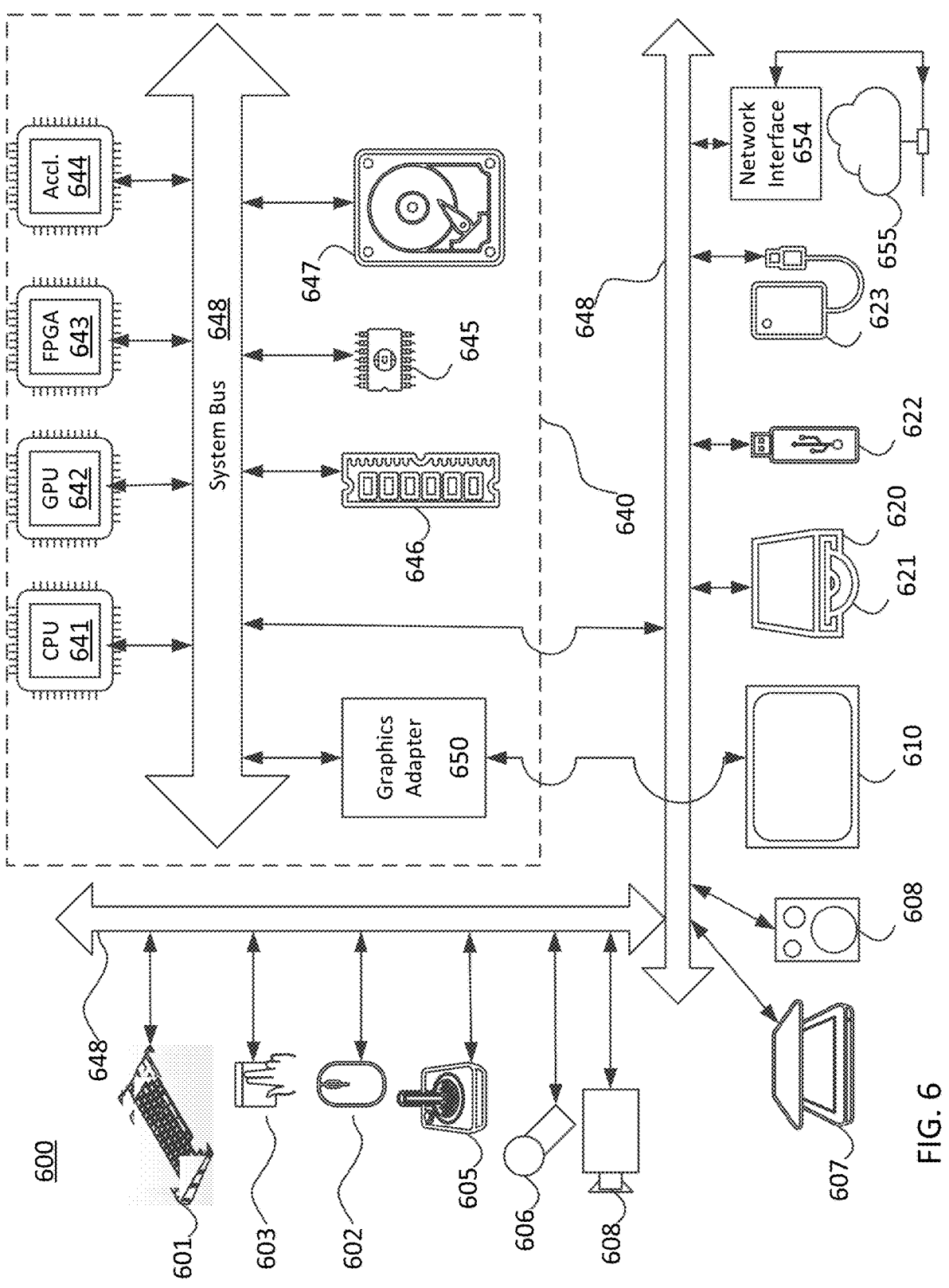
FIG. 6 is a diagram of a computer system suitable for implementing the embodiments of the present disclosure.

The components shown in FIG. 6 for computer system 600 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 600.

Computer system 600 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 601, mouse 602, trackpad 603, touch screen 610, data-glove, joystick 605, microphone 606, scanner 607, camera 608.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 610, data glove, or joystick 605, but there may also be tactile feedback devices that do not serve as input devices). For example, such devices may be audio output devices (such as: speakers 609, headphones (not depicted)), visual output devices (such as screens 610 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 600 may also include human accessible storage devices and their associated media such as optical media including CD/DVD ROM/RW 620 with CD/DVD or the like media 621, thumb-drive 622, removable hard drive or solid state drive 623, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 600 may also include interface to one or more communication networks. Networks may be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 649 (such as, for example USB ports of the computer system 600; others are commonly integrated into the core of the computer system 600 by attachment to a system bus as described below (for example Ethernet interface into a PC computer system or cellular network interface into a smartphone computer system). Using any of these networks, computer system 600 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 655. Certain protocols and protocol stacks may be used on each of those networks and network interfaces as described above.

Aforementioned human interface devices, human-accessible storage devices, and network interfaces 654 may be attached to a core 640 of the computer system 600.

The core 640 may include one or more Central Processing Units (CPU) 641, Graphics Processing Units (GPU) 642, specialized programmable processing units in the form of Field Programmable Gate Areas (FPGA) 643, hardware accelerators for certain tasks 644, and so forth. These devices, along with Read-only memory (ROM) 645, Random-access memory 646, internal mass storage such as internal non-user accessible hard drives, SSDs, and the like 647, may be connected through a system bus 648. In some computer systems, the system bus 648 may be accessible in the form of one or more physical plugs to enable extensions by additional CPUs, GPU, and the like. The peripheral devices may be attached either directly to the core's system bus 648, or through a peripheral bus 649. Architectures for a peripheral bus include PCI, USB, and the like. A graphics adapter 650 may be included in the core 640.

CPUs 641, GPUs 642, FPGAs 643, and accelerators 644 may execute certain instructions that, in combination, may make up the aforementioned computer code. That computer code may be stored in ROM 645 or RAM 646. Transitional data may be also be stored in RAM 646, whereas permanent data may be stored for example, in the internal mass storage 647. Fast storage and retrieve to any of the memory devices may be enabled through the use of cache memory, that may be closely associated with one or more CPU 641, GPU 642, mass storage 647, ROM 645, RAM 646, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, the computer system having architecture 600, and specifically the core 640 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 640 that are of non-transitory nature, such as core-internal mass storage 647 or ROM 645. The software implementing various embodiments of the present disclosure may be stored in such devices and executed by core 640. A computer-readable medium may include one or more memory devices or chips, according to particular needs. The software may cause the core 640 and specifically the processors therein (including CPU, GPU, FPGA, and the like) to execute particular processes or particular parts of particular processes described herein, including defining data structures stored in RAM 646 and modifying such data structures according to the processes defined by the software. In addition or as an alternative, the computer system may provide functionality as a result of logic hardwired or otherwise embodied in a circuit (e.g., accelerator 644), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of encoding a mesh, the method comprising:
   determining a symmetry plane the divides the mesh into a first side and a second side opposite the first side;
   determining a first plane based on a first input vertex located on the first side of the mesh, a direction vector, and a first vector selected along an axis having a largest angle from the direction vector;
   determining, as a first set, each vertex of the mesh on the second side of the mesh that is on a first side of the first plane or on the first plane;
   determining, as a second set, each vertex on the second side of the mesh that is on a second side of the first plane, the second side of the first plane opposite to the first side of the first plane;
   determining a second plane based on a second input vertex on the symmetry plane, the direction vector, and a second vector that is perpendicular to the first vector and the direction vector;

determining, as third set, each vertex on the second side of the mesh that is on a first side of the second plane or on the second plane;
   determining, as a fourth set, each vertex on the second side of the mesh that is on a second side of the second plane, the second side of the second plane opposite to the first side of the first plane; and
   determining a vertex to be mapped to the first input vertex on the first side of the mesh based on (i) a line that passes through the first input vertex and the second input vertex and (ii) the determined first set, the determined second set, the determined third set, and the determined fourth set, the determining the vertex further comprising:
      determining each intersection face defined by a plurality of vertices on the second side of the mesh that intersects with at least one vertex from the first set, the second set, the third set, and the fourth set, in which based on a determination that the line passes through a first set of N intersection points on the first side of the mesh and a second set of M intersection points on the second side of the mesh, the intersection points from the first set are mapped to a corresponding intersection point in the second set in a decreasing order of distance from the symmetry plane until the first set or the second set includes one or more unmapped intersection points, the one or more unmapped intersection points are mapped to a corresponding vertex on an opposite side of the mesh, and in which N is not equal to M and both N and M are integers greater than or equal to 2.

2. The method according to claim 1, wherein based on a determination that no intersection interface exists, a vertex on the second side of the mesh that is nearest to the line is selected as the vertex to be mapped to the first input vertex.

3. The method according to claim 1, where based on a determination that an intersection face exists, a vertex of the intersection interface in which the line passes is selected as the vertex to be mapped to the first input vertex.

4. The method according to claim 3, wherein based on a determination the line passes through two or more vertices of the intersection interface, a vertex of the two or more vertices that is closest to the first input vertex is selected as the vertex to be mapped to the first input vertex.

5. The method according to claim 1, wherein based on a determination the line passes through a first intersection point on the first side of the mesh and two intersection points on the second side of the mesh, the first intersection point on the first side of the mesh is mapped to an average of the two intersection points on the second side of the mesh.

6. The method of claim 1, wherein based on a determination that the line passes through a first intersection point on the first side of the mesh and a second intersection point on the second side of the mesh, the first intersection point on the first side of the mesh is mapped to the second intersection point on the second side of the mesh.

7. The method according to claim 1, wherein based on a determination that the line passes through N intersection points on the first side of the mesh and N intersection points on the second side of the mesh, each intersection point on the first side of the mesh is mapped to a corresponding intersection point on the second side of the mesh in a decreasing order of distance from the symmetry plane, wherein N is an integer greater than or equal to 2.

8. The method according to claim 1, further comprising:
   deriving a sub-mesh associated with the mapped vertex; and mapping the sub-mesh to a sub-mesh derived on the first side of the mesh.

9. A method of encoding a mesh, the method comprising: generating a bitstream comprising the mesh, wherein a symmetry plane that divides the mesh into a first side and a second side opposite the first side is determined, wherein a first plane is determined based on a first input vertex located on the first side of the mesh, a direction vector, and a first vector selected along an axis having a largest angle from the direction vector, wherein, as a first set, each vertex of the mesh on the second side of the mesh that is on a first side of the first plane or on the first plane is determined, wherein, as a second set, each vertex on the second side of the mesh that is on a second side of the first plane, the second side of the first plane opposite to the first side of the first plane is determined, wherein a second plane is determined based on a second input vertex on the symmetry plane, the direction vector, and a second vector that is perpendicular to the first vector and the direction vector, wherein, as third set, each vertex on the second side of the mesh that is on a first side of the second plane or on the second plane is determined, wherein, as a fourth set, each vertex on the second side of the mesh that is on a second side of the second plane, the second side of the second plane opposite to the first side of the first plane is determined, wherein a vertex to be mapped to the first input vertex on the first side of the mesh is determined based on (i) a line that passes through the first input vertex and the second input vertex and (ii) the determined first set, the determined second set, the determined third set, and the determined fourth set, and wherein the vertex to be mapped to the first input vertex is further determined based on determining each intersection face defined by a plurality of vertices on the second side of the mesh that intersects with at least one vertex from the first set, the second set, the third set, and the fourth set, in which based on a determination that the line passes through a first set of N intersection points on the first side of the mesh and a second set of M intersection points on the second side of the mesh, the intersection points from the first set are mapped to a corresponding intersection point in the second set in a decreasing order of distance from the symmetry plane until the first set or the second set includes one or more unmapped intersection points, the one or more unmapped intersection points are mapped to a corresponding vertex on an opposite side of the mesh, and in which N is not equal to M and both N and M are integers greater than or equal to 2.

10. The method according to claim 9, wherein based on a determination that no intersection interface exists, a vertex on the second side of the mesh that is nearest to the line is selected as the vertex to be mapped to the first input vertex.

11. The method according to claim 9, where based on a determination that an intersection face exists, a vertex of the intersection interface in which the line passes is selected as the vertex to be mapped to the first input vertex.

12. The method according to claim 11, wherein based on a determination the line passes through two or more vertices of the intersection interface, a vertex of the two or more vertices that is closest to the first input vertex is selected as the vertex to be mapped to the first input vertex.

13. The method according to claim 9, wherein based on a determination the line passes through a first intersection point on the first side of the mesh and two intersection points on the second side of the mesh, the first intersection point on the first side of the mesh is mapped to an average of the two intersection points on the second side of the mesh.

14. The method of claim 9, wherein based on a determination that the line passes through a first intersection point on the first side of the mesh and a second intersection point on the second side of the mesh, the first intersection point on the first side of the mesh is mapped to the second intersection point on the second side of the mesh.

15. The method according to claim 9, wherein based on a determination that the line passes through N intersection points on the first side of the mesh and N intersection points on the second side of the mesh, each intersection point on the first side of the mesh is mapped to a corresponding intersection point on the second side of the mesh in a decreasing order of distance from the symmetry plane, wherein N is an integer greater than or equal to 2.

16. A method of decoding a mesh, the method comprising: processing a bitstream comprising the mesh, wherein a symmetry plane that divides the mesh into a first side and a second side opposite the first side is determined, wherein a first plane is determined based on a first input vertex located on the first side of the mesh, a direction vector, and a first vector selected along an axis having a largest angle from the direction vector, wherein, as a first set, each vertex of the mesh on the second side of the mesh that is on a first side of the first plane or on the first plane is determined, wherein, as a second set, each vertex on the second side of the mesh that is on a second side of the first plane, the second side of the first plane opposite to the first side of the first plane is determined, wherein a second plane is determined based on a second input vertex on the symmetry plane, the direction vector, and a second vector that is perpendicular to the first vector and the direction vector, wherein, as third set, each vertex on the second side of the mesh that is on a first side of the second plane or on the second plane is determined, wherein, as a fourth set, each vertex on the second side of the mesh that is on a second side of the second plane, the second side of the second plane opposite to the first side of the first plane is determined, wherein a vertex to be mapped to the first input vertex on the first side of the mesh is determined based on (i) a line that passes through the first input vertex and the second input vertex and (ii) the determined first set, the determined second set, the determined third set, and the determined fourth set, and wherein the vertex to be mapped to the first input vertex is further determined based on determining each intersection face defined by a plurality of vertices on the second side of the mesh that intersects with at least one vertex from the first set, the second set, the third set, and the fourth set, in which based on a determination that the line passes through a first set of N intersection points on the first side of the mesh and a second set of M intersection points on the second side of the mesh, the intersection points from the first set are mapped to a corresponding intersection point in the second set in a decreasing order of distance from the symmetry plane until the first set or the second set includes one or more unmapped intersection points, the one or more unmapped intersection points are mapped to a corresponding vertex on an opposite side of the mesh, and in which N is not equal to M and both N and M are integers greater than or equal to 2.

\* \* \* \* \*